US010337394B2

(12) United States Patent
Kondou et al.

(10) Patent No.: US 10,337,394 B2
(45) Date of Patent: Jul. 2, 2019

(54) BLOWER FOR VEHICLE

(71) Applicant: DENSO CORPORATION, Kariya, Aichi-pref. (JP)

(72) Inventors: Toshikatsu Kondou, Kariya (JP); Yukio Shidara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/543,601

(22) PCT Filed: Feb. 3, 2016

(86) PCT No.: PCT/JP2016/000550
§ 371 (c)(1),
(2) Date: Jul. 14, 2017

(87) PCT Pub. No.: WO2016/132693
PCT Pub. Date: Aug. 25, 2016

(65) Prior Publication Data
US 2018/0003101 A1 Jan. 4, 2018

(30) Foreign Application Priority Data
Feb. 17, 2015 (JP) .................................. 2015-028746

(51) Int. Cl.
*F01P 11/10* (2006.01)
*B60K 11/04* (2006.01)
(Continued)

(52) U.S. Cl.
CPC ............... *F01P 11/10* (2013.01); *B60K 11/04* (2013.01); *B60K 11/08* (2013.01); *F01P 3/18* (2013.01);
(Continued)

(58) Field of Classification Search
CPC ...... F01P 11/10; F01P 3/18; F01P 5/06; F01P 2070/50; B60K 11/04; B60K 11/08
See application file for complete search history.

(56) References Cited

U.S. PATENT DOCUMENTS 4,756,279 A * 7/1988 Temmesfeld ............ F01P 11/10
123/198 E
5,720,341 A * 2/1998 Watanabe ............... F28D 1/024
165/135

(Continued)

FOREIGN PATENT DOCUMENTS

JP H04026814 U 3/1992
JP H04059336 U 5/1992
(Continued)

*Primary Examiner* — Devon Russell
(74) *Attorney, Agent, or Firm* — Harness, Dickey & Pierce, P.L.C.

(57) ABSTRACT

A blower has a blower fan and a half shroud. The blower fan supplies air to a heat exchanger. The heat exchanger has a core that performs a heat exchange between a heat medium and the air. The half shroud covers a part of the core and defines an air passage extending from the heat exchanger to the blower fan. A blocking plate is disposed in a non-overlapping portion in which the half shroud and the core are located not to overlap with each other. The blocking plate prevents the air, which is blown by the blower fan, from flowing into an upstream area of the blower fan in a flow direction of the air through the non-overlapping portion.

3 Claims, 3 Drawing Sheets

(51) Int. Cl.
 *B60K 11/08* (2006.01)
 *F01P 3/18* (2006.01)
 *F01P 5/06* (2006.01)
 *F04D 29/64* (2006.01)

(52) U.S. Cl.
 CPC ............. *F01P 5/06* (2013.01); *F01P 2070/50* (2013.01); *F04D 29/646* (2013.01)

(56) References Cited

U.S. PATENT DOCUMENTS

| | | | | |
|---|---|---|---|---|
| 7,451,844 B2* | 11/2008 | Kunikata | ............... | B60K 11/04 180/68.1 |
| 7,603,968 B2* | 10/2009 | Pantow | ................... | B60K 11/02 123/41.04 |
| 8,182,217 B2* | 5/2012 | Schaffer | .................... | F01P 5/06 415/214.1 |
| 8,312,949 B2* | 11/2012 | Hirukawa | ............... | B60K 11/08 180/68.1 |
| 8,479,855 B2* | 7/2013 | Kim | ....................... | B60K 11/02 180/68.3 |
| 2006/0257251 A1* | 11/2006 | Carlson | ................. | F04D 29/661 415/178 |
| 2007/0119395 A1* | 5/2007 | Nagano | .................... | F01P 11/10 123/41.65 |
| 2007/0209613 A1 | 9/2007 | Pantow | | |
| 2008/0023173 A1* | 1/2008 | Savage | .............. | B60H 1/00328 165/41 |
| 2008/0072851 A1* | 3/2008 | McLennan | ........ | B29C 45/14016 123/41.49 |
| 2011/0259558 A1* | 10/2011 | Colpan | .................... | F01P 1/10 165/121 |

FOREIGN PATENT DOCUMENTS

| | | |
|---|---|---|
| JP | 2001132453 A | 5/2001 |
| JP | 2005307921 A | 11/2005 |
| JP | 2007532814 A | 11/2007 |
| JP | 2008309121 A | 12/2008 |

* cited by examiner

BLOWER FOR VEHICLE

CROSS REFERENCE TO RELATED APPLICATIONS

This application is a U.S. National Phase Application under 35 U.S.C. 371 of International Application No. PCT/JP2016/000550 filed on Feb. 3, 2016 and published in Japanese as WO 2016/132693 A1 on Aug. 25, 2016. This application is based on and claims the benefit of priority from Japanese Patent Application No. 2015-028746 filed on Feb. 17, 2015. The entire disclosures of all of the above applications are incorporated herein by reference.

TECHNICAL FIELD

The present disclosure relates to a blower for a vehicle that supplies air to a heat exchanger such as a radiator.

BACKGROUND ART

A blower mounted in a vehicle has a blower fan and a shroud. The blower fan supplies air to a radiator. The shroud supports the blower fan and defines an air passage extending from the radiator to the blower fan.

The blower is known to increase a volume of running wind supplied to the radiator in a manner that the shroud is configured to cover only a part of a radiator core so as to improve a cooling performance of the vehicle while moving at a high speed. On the other hand, another blower is known to force air blown by a blower fan to pass through an entirety of a radiator core by configuring a shroud to cover an entire surface of a radiator core, so as to improve a cooling performance of a vehicle while stopping and being in an idling condition.

Another blower is disclosed (e.g., in Patent Literature 1) to have a shroud that covers an entire surface of a radiator core. The shroud has an opening and a flap that opens and closes the opening by a ram pressure of the running wind of the vehicle. The blower is capable of opening and closing the opening by rotating the flap from the wall of the shroud toward an inside of the shroud.

According to the blower described in Patent Literature 1, the flap rotates by the ram pressure of the running wind passing through the radiator and opens the opening while the vehicle is moving. As a result, the running wind in a motor fan shroud can flow toward a vehicle rear side efficiently. In addition, the blower can cause air blown by a blower fan to pass through an entirety of the radiator while the vehicle is stopped and in an idling condition.

PRIOR ART LITERATURES

Patent Literature

Patent Literature 1: JP 2005-307921 A

SUMMARY OF INVENTION

However, according to studies conducted by the inventors of the present disclosure, a configuration of the blower described in Patent Literature 1 may be complicated since the flap opening and closing the opening by the ram pressure of the running air of the vehicle is provided in the shroud.

The present disclosure addresses the above-described issues, and it is an objective of the present disclosure to provide a blower for a vehicle that supplies air to a heat exchanger and can improve, with a simple structure, a heat exchange performance of the heat exchanger both while the vehicle is moving and while the vehicle is stopping.

A blower for a vehicle according to the present disclosure has a blower fan and a half shroud. The blower fan supplies air to a heat exchanger. The heat exchanger has a core that performs a heat exchange between a heat medium and the air. The half shroud covers a part of the core and defines an air passage extending from the heat exchanger to the blower fan. A blocking plate is disposed in a non-overlapping portion in which the half shroud and the core are located not to overlap with each other. The blocking plate prevents the air blown by the blower fan from flowing into an upstream area of the blower fan in a flow direction of the air through the non-overlapping portion.

The non-overlapping portion in which the half shroud and the core of the heat exchanger are arranged not to overlap with each other is defined by configuring the half shroud to cover the part of the core. As a result, a volume of running air supplied to the core of the heat exchanger can be increased, and thereby a heat exchange performance while the vehicle is moving at a high speed can be improved.

The blocking plate can prevent the air blown by the blower fan from flowing into the upstream area of the blower fan in the flow direction through the non-overlapping portion by disposing the blocking plate in the non-overlapping portion. Accordingly, the heat exchange performance can be improved while the vehicle is stopping and is in an idling condition.

In addition, according to the present disclosure, a complicated configuration such as a flap that opens and closes an opening is not necessary. Therefore, the heat exchange performance can be improved both while the vehicle is moving and while the vehicle is stopping.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Figure 1:
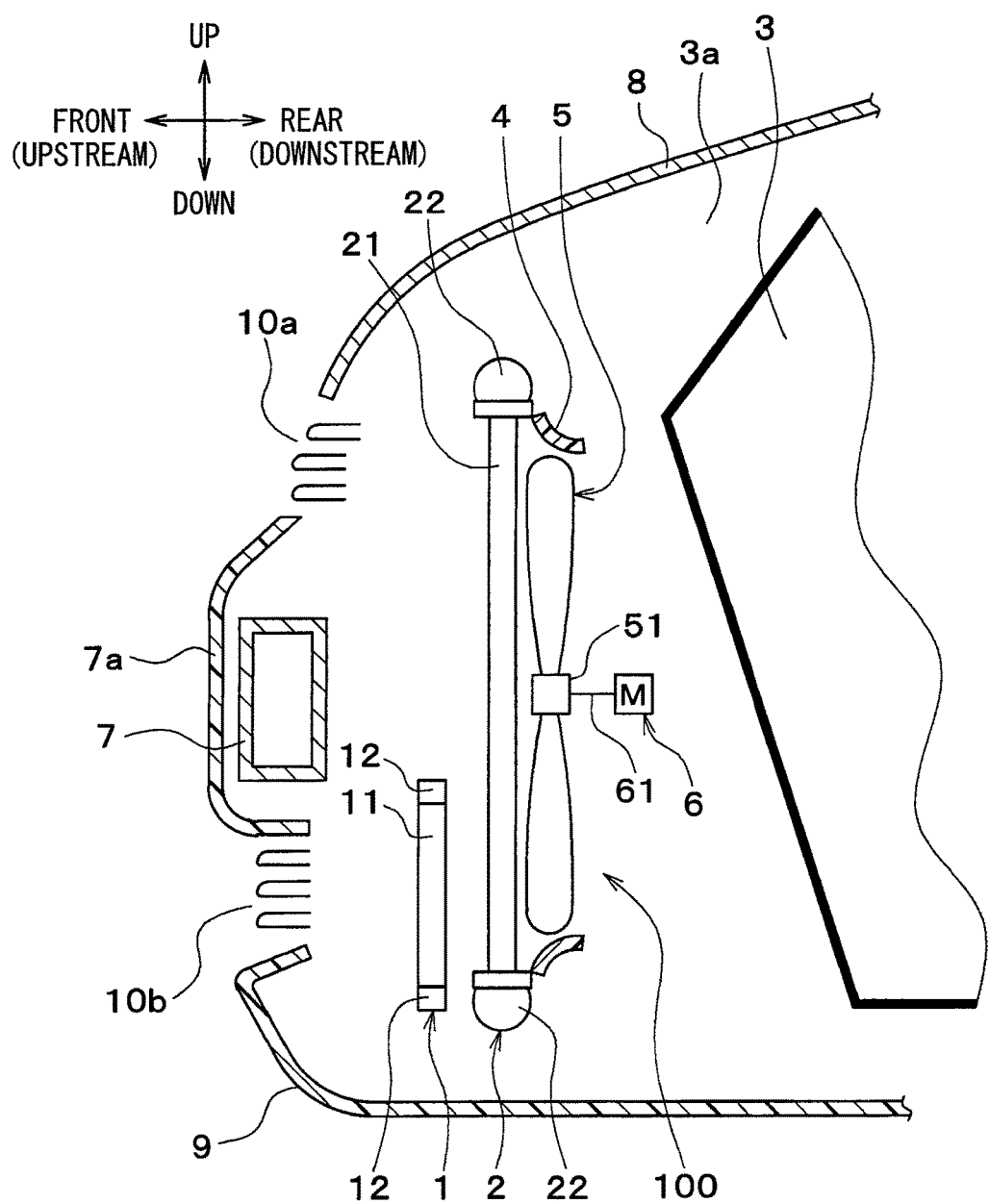
FIG. 1 is a schematic cross-sectional view illustrating a front end portion of a vehicle in which a blower for a vehicle is mounted, according to a first embodiment.

Embodiments of the present disclosure will be described hereafter referring to drawings. In the embodiments, a part that corresponds to or equivalents to a part described in a preceding embodiment may be assigned with the same reference number, and a redundant description of the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment will be described hereafter referring to the drawings. According to the present embodiment, a blower for a vehicle (that will be referred to as a blower simply hereafter) of the present disclosure is mounted in a front end area of the vehicle. In the following description for the embodiments, "upper" and "lower" mean "upper in a vertical direction" and "lower in the vertical direction" respectively. Directions of front, rear, left, and right mean front, rear, left, and right with reference to a traveling direction of the vehicle.

As shown in FIG. 1, a blower 100 of the present embodiment is embedded in a front end panel (not shown) and configures an assembled structure, i.e., a cooling module, together with an intercooler 1 and a radiator 2. The front end panel supports peripheries of the intercooler 1 and the radiator 2 and guides air passing through the intercooler 1 and the radiator 2.

The intercooler 1 is a heat exchanger that performs a heat exchange between air and supercharged air supercharged to an engine (i.e., an internal combustion engine) 3 by a supercharger (not shown) and thereby cooling the supercharged air. The intercooler 1 has a core 11 and a header tank 12. The core 11 has tubes (not shown) in which the supercharged air flows. The header tank 12 is disposed at end portions of the tubes on each end side. According to the intercooler 1 of the present embodiment, the header tank 12 is located on the each end side of the core 11 in the vertical direction.

The radiator 2 is a heat exchanger having a core 21 that performs a heat exchange between cooling water (i.e., a heat medium) for the engine 3 and the air and that cools the cooling water. The core 21 of the radiator 2 has tubes (not shown) in which the cooling water flows. The radiator 2 has a header tank 22 that is disposed to end portions of the tubes on each end side. According to the radiator 2 of the present embodiment, the header tank 22 is located on the each end side of the core 21 in the vertical direction.

An exterior of the intercooler 1 and an exterior of the radiator 2 have a square shape (e.g., generally a rectangular shape according to the present embodiment) when viewed in a planar view, i.e., when viewed from a flow direction of the air. The intercooler 1 is located upstream of the radiator 2 in the flow direction, that is, located on a front side of the radiator 2 in a front-rear direction of the vehicle. A length of the intercooler 1 in the vertical direction is shorter than a length of the radiator 2 in the vertical direction.

The core 11 of the intercooler 1 is arranged to face a lower portion of the core 21 of the radiator 2. The intercooler 1 is arranged to face a second front opening 10b described later.

The blower 100 is arranged on a rear side of the radiator 2. The blower 100 has a half shroud 4, a blower fan 5, and a motor 6. A configuration of the blower 100 in detail will be described later.

The intercooler 1 and the radiator 2 are disposed in the front end area of the vehicle, i.e., on a rear side of a bumper reinforcement 7 in a front area in an engine room 3a in which the engine 3 or a transmission is disposed.

The bumper reinforcement 7 is a beam member that extends in a width direction (i.e., a left-right direction) of the vehicle in the front end area of the vehicle and that absorbs colliding force applied to the vehicle from a front side. Both ends of the bumper reinforcement 7 in the left-right direction are connected to side members (not shown) of a body of the vehicle through stress absorbers (not shown) respectively. The stress absorbers are commonly referred to as a crush box and are a member that is capable of being deformed easily by the colliding force.

A bumper cover 7a as a design part is arranged adjacent to a front surface of the bumper reinforcement 7. The bumper cover 7a covers the front surface of the bumper reinforcement 7.

An upper opening of the engine room 3a in which the intercooler 1, the radiator 2, and the engine 3 are disposed is closed by an engine food (i.e., a bonnet) 8 that is a covering member. A lower side of the engine room 3a is substantially covered by a lower cover 9.

A first front opening 10a is arranged above the bumper reinforcement 7, and the second front opening 10b is arranged below the bumper reinforcement 7. The first front opening 10a is provided mainly to introduce air for cooling the radiator 2. The second front opening 10b is provided to introduce air for cooling the intercooler 1 and the radiator 2.

An entire configuration of the blower 100 according to the present embodiment will be described hereafter referring to FIG. 2.

Figure 2:
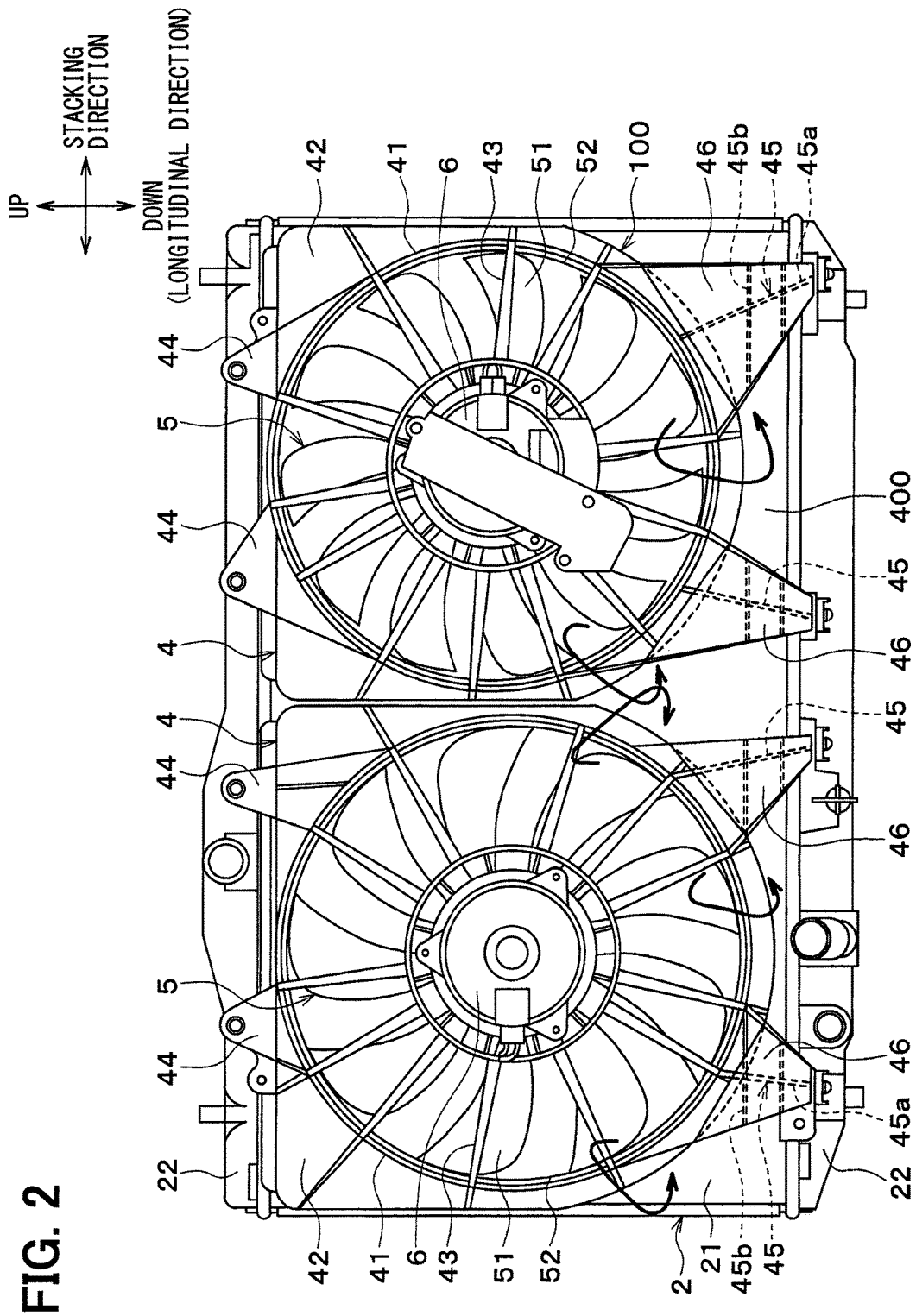
FIG. 2 is a front view illustrating the blower for a vehicle when viewed from a downstream side in a flow direction of air, according to the first embodiment.

As shown in FIG. 2, the blower 100 of the present embodiment has two half shrouds 4, two blower fans 5, and two motors 6. That is, the blower 100 of the present embodiment has two blower modules, each of which is configured by the half shroud 4, the blower fan 5, and the motor 6. The two blower modules are arranged in a stacking direction of the tubes of the radiator 2.

The half shroud 4 of the blower 100 is made of resin (e.g., fiberglass-reinforced polypropylene). The half shroud 4 supports the motor 6 and defines an air passage extending from the radiator 2 to the blower fan 5. The half shroud 4 is located on a rear side of the radiator 2, i.e., downstream of the radiator 2 in a flow direction of air.

The half shroud 4 covers a part of the core 21 of the radiator 2. According to the present embodiment, the half shroud 4 covers an upper portion of the core 21 of the radiator 2.

Specifically, the half shroud 4 has a tubular portion 41 and a plane portion 42. The tubular portion 41 has an annular shape (i.e., a tubular shape) and covers an outer periphery of the blower fan 5. The plane portion 42 defines a seamless passage that connects a space, which is defined downstream of the radiator 2 in an upper area of the radiator 2, to the tubular portion 41. The plane portion 42 covers an upper portion of a rear surface of the core 21 of the radiator 2.

The blower fan 5 is an axial fan that blows air to the core 11 of the intercooler 1 and the core 21 of the radiator 2 and is configured to rotate around a rotary shaft. The blower fan 5 has a boss 51, blades 52, and a ring 53. The boss 51 is arranged at a rotational center (refer to FIG. 1). The blades 52 are arranged in a rotational direction to extend radially and to be distanced from each other. The ring 53 connects outer peripheries of the blades 52 annularly to each other.

The blower fan 5 is located in a hollow portion defined in the tubular portion 41 of the half shroud 4. A void is defined between an outer surface of the ring 53 and an inner surface of the tubular portion 41. Accordingly, the blower fan 5 can rotate in the tubular portion 41 without being in contact with the tubular portion 41.

The motor 6 is an electrical motor that applies rotational force to the blower fan 5 and has a motor shaft 61 (refer to FIG. 1). The motor 6 is supported by motor stays 43 provided with the tubular portion 41 of the half shroud 4. The motor 6 rotates the blower fan 5 by rotating the motor shaft 61 and generates an air flow flowing in an axial direction of the blower fan 5, i.e., in an axial direction of the rotary shaft. These are the entire configuration of the blower 100.

A shape of the half shroud 4 will be described hereafter in detail.

As shown in FIG. 2, a connector 44 that fixes the half shroud 4 to the header tank 22 located above the radiator 2 is connected to an upper portion of the plane portion 42 of the half shroud 4. The connector 44 has a plate shape and extends upward from an upper edge of the plane portion 42. According to the present embodiment, the connector 44 is provided integrally with the half shroud 4. A quantity of the connector 44 disposed to a single plane portion 42 is two.

A leg 45 is arranged below the plane portion 42 in the half shroud 4 and connects the half shroud 4 to the header tank 22 located below the radiator 2. The leg 45 has a first elongated member 45a extending generally in the vertical direction and a second elongated member 45b extending generally in the horizontal direction (i.e., the stacking direction of the tubes). The leg 45 has a mesh shape (i.e., a lattice shape) defining openings therein, and the mesh shape is configured by assembling more than one of the first elongated member 45a and more than one of the second elongated member 45b to intersect with each other.

According to the present embodiment, the leg 45, i.e., the first elongated member 45a and the second elongated member 45b, is provided integrally with the half shroud 4. A quantity of the leg 45 disposed to a single plane portion 42 is two.

A blocking plate (i.e., intersecting plate) 46 is provided in a non-overlapping portion 400 in which the core 21 of the radiator 2 and the half shroud 4 are located not to overlap with each other. The non-overlapping portion 400 is, i.e., a portion of the core 21 of the radiator 2 that is not covered with the half shroud 4. The blocking plate 46 prevents air, which is blown by the blower fan 5, from flowing into an upstream area of the blower fan 5 in the flow direction of air through the non-overlapping portion 400. The blocking plate 46 has a plate shape extending in a direction generally perpendicular to the flow direction of air.

The leg 45 of the present embodiment is arranged in the non-overlapping portion 400 in which the core 21 of the radiator 2 and the half shroud 4 are located not to overlap with each other. Therefore, according to the present embodiment, the blocking plate 46 is provided to each leg 45.

Specifically, the blocking plate 46 is connected to a downstream portion (i.e., a portion on a vehicle rear side) of the leg 45 in the flow direction of air. The blocking plate 46 has a square shape that closes all openings of the mesh (i.e., the lattice) of the leg 45. According to the present embodiment, the blocking plate 46 is connected to the half shroud 4.

As described above, according to the present embodiment, the blower 100 has the half shroud 4 that covers the upper portion of the core 21 of the radiator 2. As a result, the non-overlapping portion 400 in which the core 21 of the radiator 2 and the half shroud 4 are located not to overlap with each other is defined, and thereby a volume of running air supplied to the core 21 of the radiator 2 can be increased, and a cooling performance while the vehicle is traveling at high speed can be improved.

Here, in a case that the non-overlapping portion 400 is located downstream of the radiator 2 in the flow direction of air, a roundabout flow of the air, which is blown by the blower fan 5, causes. In other words, the air, which is blown by the blower fan 5, flows into the upstream area of the blower fan 5 through the non-overlapping portion 400.

When the roundabout flow is caused, a volume of air blown by the blower fan 5 decreases, and the cooling performance of the radiator 2 while the vehicle is stopped and in an idling condition in which the blower fan 5 is requested to cause a forced airflow may deteriorate.

Then, the blocking plate 46 is provided in the non-overlapping portion 400 according to the present embodiment. Accordingly, the blocking plate 46 can suppress a cause of the roundabout flow, and thereby the cooling performance while the vehicle is stopped and in the idling condition can be improved.

In this case, a complicated configuration such as flap for opening and closing an opening is not necessary, and thereby the cooling performance of the radiator 2 can be improved, with a simple configuration, both while the vehicle is traveling and while the vehicle is being stopped.

A vehicle of which engine is downsized with a supercharging system is increasing in recent years. The vehicle improves a fuel efficient by using a turbocharged small exhaust engine. Such vehicle tends to have the intercooler 1 for cooling supercharged air that is arranged upstream (i.e., on a front side) of the radiator in the flow direction of air as the present embodiment.

The running air hardly flows to a lower portion of the core 21 of the radiator 2 that is located to overlap with the intercooler 1 when the intercooler 1 is located upstream of the radiator in the flow direction of air. As a result, the cooling performance of the radiator 2 may deteriorate when the vehicle is moving at a high speed.

Then, according to the present embodiment, the half shroud 4 is arranged to cover the upper portion of the core 21 of the radiator 2 and not to cover a lower portion of the core 21. Accordingly, the running air easily flows to the lower portion of the core 21 located to overlap with the intercooler 1 when the vehicle moves at a high speed. As a result, the cooling performance of the radiator 2 can be prevented from deteriorating when the vehicle moves at a high speed in a case that the intercooler 1 is located upstream of the radiator 2 in the flow direction of air, according to the present embodiment.

However, as described above, the roundabout flow is caused relative to the blower fan 5 when the non-overlapping portion 400 is located downstream of the radiator 2 in the flow direction of air. As a result, the cooling performance of the radiator 2 may deteriorate while the vehicle is stopped and in the idling condition.

Then, according to the present embodiment, the blocking plate 46 is disposed in the non-overlapping portion 400, and thereby the cause of the roundabout flow can be suppressed. Therefore, the cooling performance can be improved while the vehicle is stopped and in the idling condition.

As described above, the present embodiment is especially effectively employed to the blower 100 that is mounted in a vehicle in which the intercooler 1 is located upstream of the radiator 2 in the flow direction of air.

Second Embodiment

A second embodiment will be described hereafter referring to FIG. 3. The blocking plate 46 of the second embodiment is different from that of the first embodiment.

Figure 3:
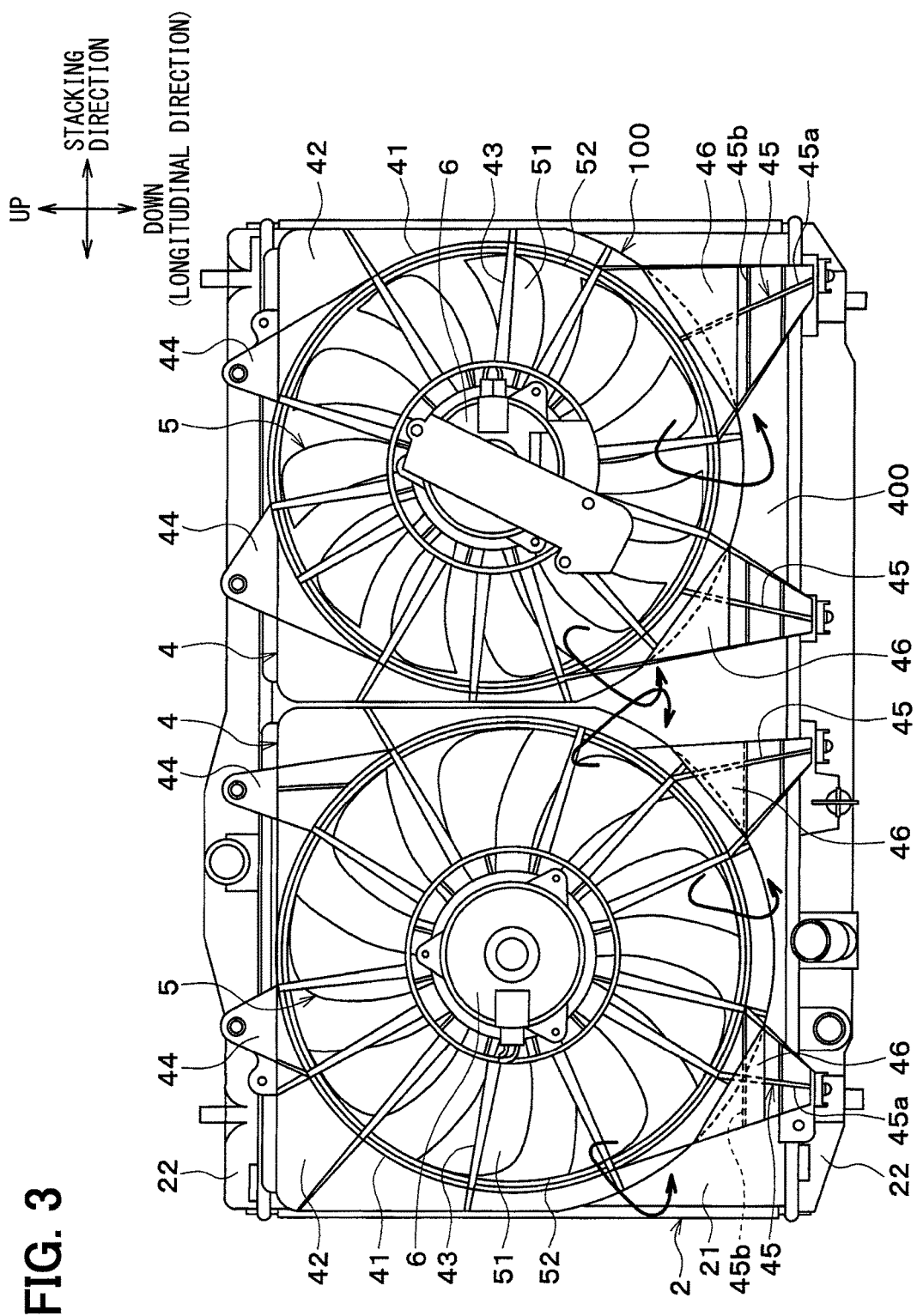
FIG. 3 is a front view illustrating a blower for a vehicle when viewed from a downstream side in a flow direction of air, according to a second embodiment.

As shown in FIG. 3, the blocking plate 46 is disposed to an upper portion of the leg 45 according to the present embodiment. The blocking plate 46 has a triangular shape that closes the openings of the mesh (i.e., the lattice) provided in the upper portion of the leg 45. Accordingly, the blocking plate 46 does not close the openings of the mesh (i.e., the lattice) provided in the lower portion of the leg 45, and thereby air flows through the lower portion of the leg 45.

Therefore, the cause of the roundabout flow can be suppressed while the vehicle is stopped and in the idling condition by disposing the blocking plate 46 to the upper portion of the leg 45, and thereby the present embodiment can be obtained the same effects as the first embodiment.

Other Modifications

It should be understood that the present disclosure is not limited to the above-described embodiments and intended to cover various modification within a scope of the present disclosure, for example, as described hereafter.

(1) The blocking plate 46 is disposed to the leg 45 according to the above-described embodiments. However an arrangement of the blocking plate 46 is not limited to the example. For example, the blocking plate 46 may be located between two legs 45.

(2) The blocking plate 46 is connected to the half shroud 4 according to the above-described embodiments. However, the blocking plate 46 may be connected to the header tank 22 of the radiator 2.

(3) According to the above-described embodiments, the intercooler 1 is arranged to face the lower portion of the core 21 of the radiator 2, and the half shroud 4 is arranged to cover the upper portion of the core 21 of the radiator 2. However, a configuration of the half shroud 4 is not limited to such example. For example, the intercooler 1 may be arranged to face the upper portion of the core 21 of the radiator 2, and the half shroud 4 may be arranged to cover the lower portion of the core 21 of the radiator 2.

According to the above-described embodiments, the blower 100 is configured by the two blower module (each of which is configured by the half shroud 4, the blower fan 5, and the motor 6). However, the blower 100 may be configured by a single blower module or by three or more blower modules.

What is claimed is:

1. A blower for a vehicle comprising:
a blower fan that supplies air to a heat exchanger, the heat exchanger having a core that performs a heat exchange between a heat medium and the air;
a half shroud that covers a part of the core and defines an air passage extending from the heat exchanger to the blower fan;
a leg that fixes the half shroud to the heat exchanger, the leg being arranged in a non-overlapping portion in which the half shroud and the core are located not to overlap with each other; and
a blocking plate attached to the leg in the non-overlapping portion, the blocking plate preventing the air, which is blown by the blower fan, from flowing through the non-overlapping portion into an upstream area of the blower fan, wherein
the leg has a lattice shape defining openings therein,
the blocking plate is attached to the leg on a downstream portion of the leg in the flow direction of the air through the fan and closes the openings of the leg
the half shroud includes a tubular portion having an annular shape and surrounding an outer periphery of the blower fan, and
the blocking plate is connected to the tubular portion and has a plate shape extending along a direction substantially perpendicular to the flow direction of the air through the fan.

2. The blower for a vehicle according to claim 1, wherein the blocking plate is disposed to an upper portion of the leg and closes the openings defined in the upper portion of the leg.

3. The blower for a vehicle according to claim 1, wherein the blocking plate has a triangular shape.

* * * * *